Aug. 5, 1952 D. R. DE TAR 2,606,315

TUNING INDUCTOR

Filed Aug. 5, 1948 3 Sheets-Sheet 1

Inventor:
Donald R. DeTar,
By Dawson, Ooms, Booth & Spangenberg
Attorneys.

Inventor:
Donald R. DeTar,
By Dawson, Ooms, Booth & Spangenberg,
Attorneys.

Inventor:
Donald R. De Tar,
By Dawson, Ooms, Booth and Spangenberg,
Attorneys.

Patented Aug. 5, 1952

2,606,315

UNITED STATES PATENT OFFICE 2,606,315

TUNING INDUCTOR

Donald R. De Tar, Stratford, Conn., assignor to Aladdin Industries, Incorporated, Chicago, Ill., a corporation of Illinois Application August 5, 1948, Serial No. 42,608

2 Claims. (Cl. 336—75)

My invention relates to an improved tuning inductor particularly suitable for use at very-high radio frequencies.

Tuning inductors employing movable plungers such as magnetic members or low-loss conducting members, are particularly desirable at very-high frequencies where circuit geometry is especially important and variable tuning capacitors introduce serious problems of circuit arrangement. However, the use of these tuning inductors in the very-high frequency range has heretofore been impractical because of the very small mechanical movements associated with large variations of frequency and the consequent requirement of precision plunger-moving devices without lost motion or backlash.

In accordance with the present invention the problems of circuit geometry and achieving precision mechanical movements heretofore associated with the use of tuning plungers in the very-high frequency tuning ranges are overcome by forming the inductance in the shape of an elongated U. The movable plunger is of elongated shape capable of being received between the parallel leg members of the U-shaped coil and is shifted in direction at right angles to the magnetic axis thereof to achieve the inductance variations requisite to tuning. Further in accordance with the present invention, two or more turns may be formed in the elongated U-shaped coil by connecting bridge members between a plurality of parallel conducting members. The bridge members at one end of the coil are shaped to define a cylinder in conjunction with the parallel conducting members and thereby permit insertion of the tuning plunger for telescoping movements relative to the leg portions of the coil.

A tuning inductor having features in common with the present invention is described and claimed in my co-pending application, S. N. 42,607, entitled "Sleeve Tuner," filed August 5, 1948, now abandoned.

It is, therefore, a general object of the present invention to provide an improved tuning inductor tunable over a wide very-high frequency band by movement of a tuning plunger over a relatively great distance to provide fine frequency adjustment without the precision mechanical structure heretofore required for this purpose.

Another object of the present invention is to provide an improved tuning inductor embodying a small number of turns and suitable for use at very-high radio frequencies and in which a tuning plunger movable along an axis transverse to the magnetic axis of the coil defined thereby is provided.

Further it is an object of the present invention to provide an improved tuning inductor capable of tuning over a wide very-high frequency band with substantially constant Q.

My invention further resides in providing an improved tuning inductor capable of efficiently tuning over a wide very-high frequency band and which embodies features of construction, combination and arrangement rendering it simple, rugged in construction, and of small size to the end that it may be used in a wide range of applications in radio equipment.

The novel features which I believe to be characteristic of my invention are set forth with particularity in the appended claims. My invention itself, however, may best be understood by reference to the following description taken in connection with the accompanying drawing in which, Figure 1 is a side elevational view with parts broken away of one embodiment of the present invention;

Figures 2 and 3 are cross-sectional views through axes 2—2 and 3—3, Figure 1, respectively;

Figure 5:
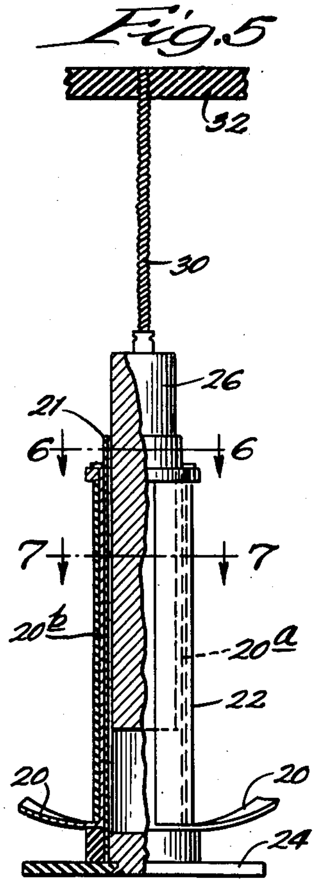
Figure 5 is a side elevational view with parts in cross-section of another embodiment of the present invention.
Figure 8:
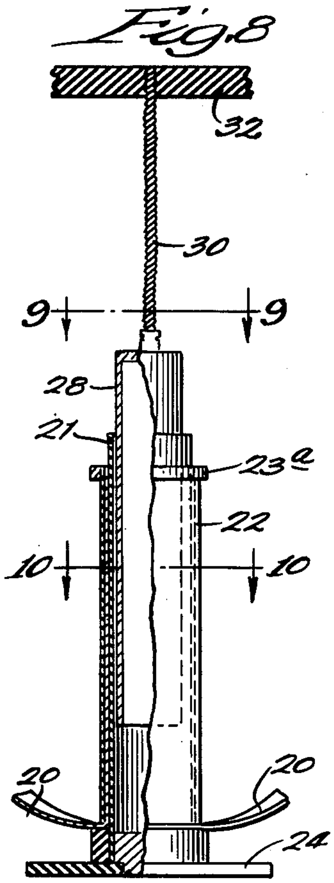
Figure 6:
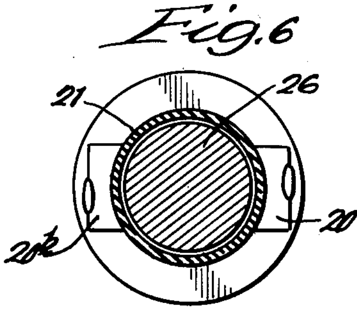
Figure 9:
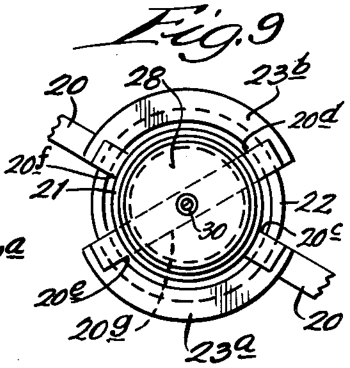
Figure 10:
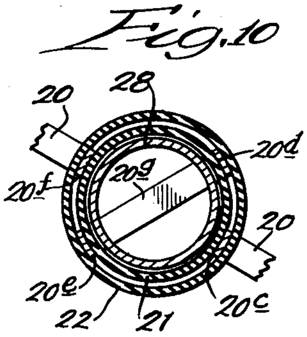
Figure 7:
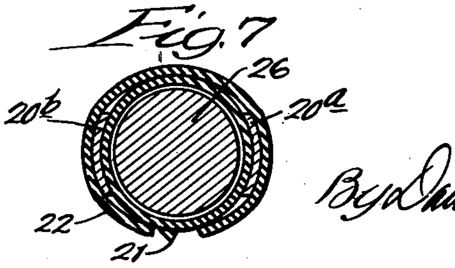
Figures 11, 12, 13:
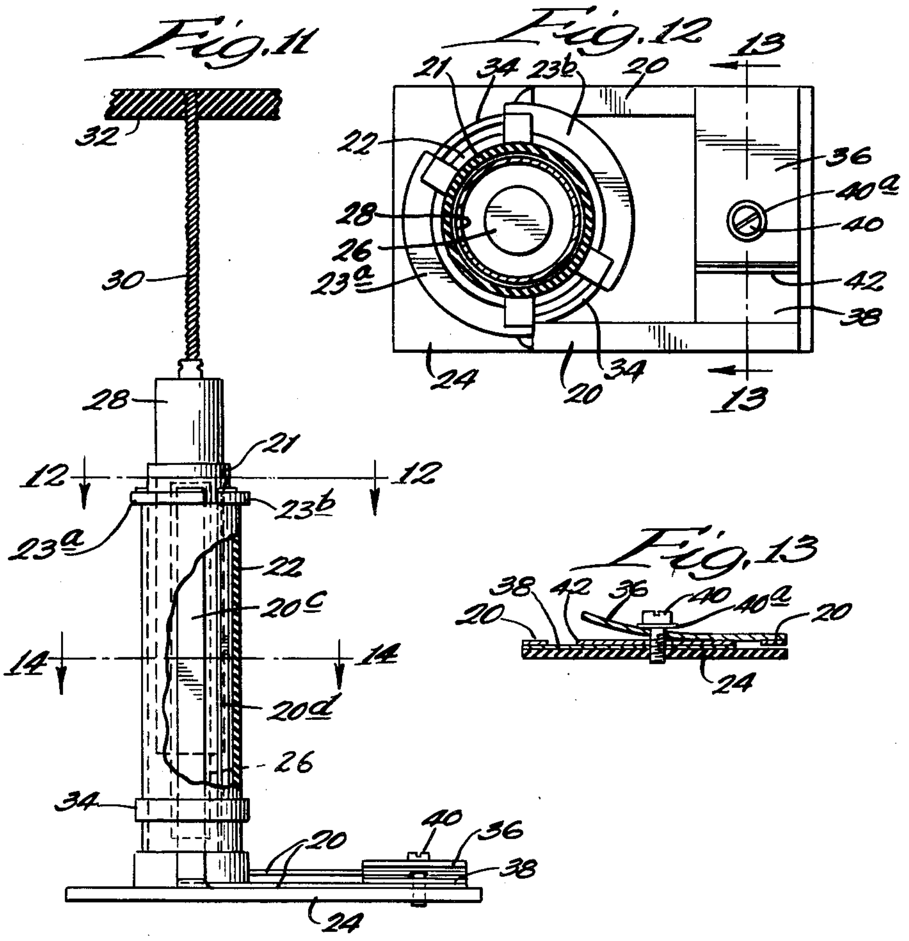

Figures 6 and 7 are cross-sectional views through the axes 6—6 and 7—7, Figure 5;

Figure 8 is a side elevational view with parts in cross-section of yet another embodiment of the present invention;

Figures 9 and 10 are cross-sectional views through the axes 9—9, and 10—10, Figure 8, respectively;

Figure 11 is a side elevational view with parts in cross-section of yet another embodiment of the present invention;

Figure 12 is a cross-sectional view of the structure of Figure 11 through axis 12—12;

Figure 13 is a cross-sectional view through the axis 13—13, Figure 12; and

Figure 14:
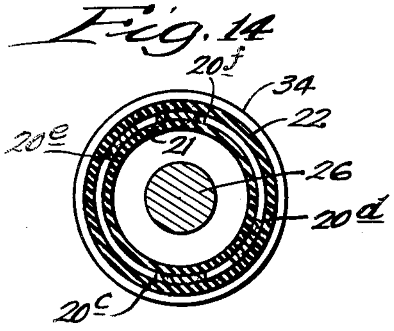

Figure 14 is a cross-sectional view through axis 14—14, Figure 11.

Figure 1:
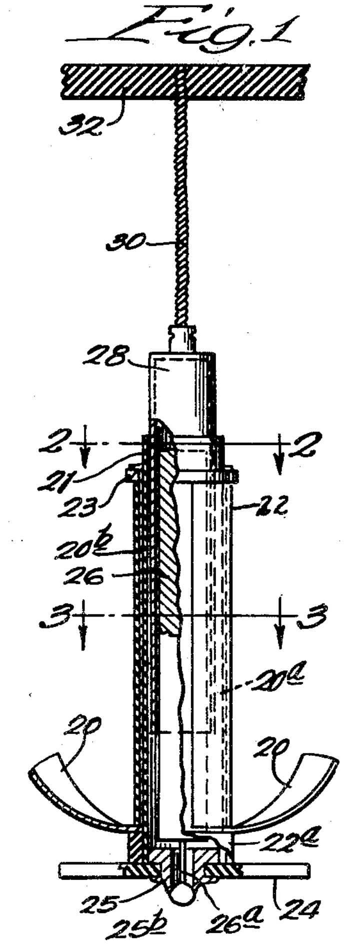
Figure 2:
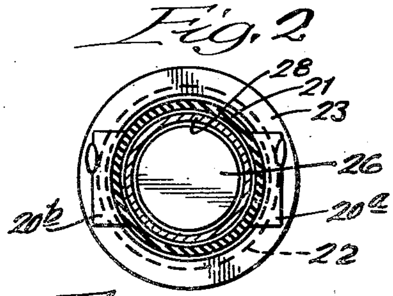
Figure 3:
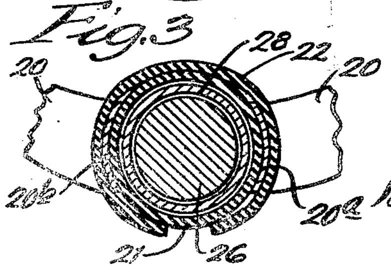

Referring now to Figures 1, 2, and 3, there is shown at 20 a conducting ribbon of copper or like material and which is snugly received in the substantially annular space between the non-conducting tubes 21 and 22. The leg portions 20a and 20b of ribbon 20 extend up this annular space along diametrically opposed elements of the cylinder defined by tubes 21 and 22. A conducting ring 23 is snugly received about tube 21 and is positioned adjacent the top edge of tube 22 as indicated. The ends of ribbon 20 are conductively joined to the ring 23 to define an inductive loop of elongated U-shaped configuration with its magnetic axis transverse to the axes of tubes 21 and 22.

The inner tube 21 is supported from an insulating base 24 to which it is attached by a plug 25 snugly received in the bottom of tube 21 and in a suitable hole in base 24. This attachment may be achieved in any one of many other ways known to the art.

The legs 20*a* and 20*b*, together with ring 23, define a cylinder having an axis midway between these legs and extending in the direction thereof. The lengthy magnetizable core 26 is mounted concentrically with the axis of this cylinder as indicated in the figures.

Core 26 is sustained within tube 21 by the resilient wire 26*a* which is molded in the bottom portion thereof and extends downwardly as shown in the broken away portion of Figure 1. This wire is held at its lower end by the solder ball 25*b* which is received on the rivet-like sleeve 25. The latter sleeve is snugly received in the opening in base 24 provided therefore and thus holds the core relative thereto. This sleeve also snugly receives the tube 21 to hold that tube in position relative to the base 24.

Sleeve 22*a* of insulating material is interposed between the base 24 and the outer sleeve 22.

The core 26 comprises a suspension of comminuted magnetic material in a non-conducting plastic binder, such as a phenolic resin. This material is characterized by relatively good magnetic permeability as compared with the air and by relatively low power losses, even at high radio frequencies.

The core 26 defines paths for magnetic flux encircling the elongated U-shaped coil defined by conductor 20 and thereby increases the inductance thereof beyond the inductance otherwise achieved.

A low-loss conducting sleeve 28 is interposed between the core 26 and the inner tube 21. This sleeve is made of copper or like material and has an upper end wall which receives the supporting shaft 30. This shaft is threaded to be received in a suitably threaded opening provided in yoke 32 to secure the sleeve 28 to yoke 32 by an adjustable connection.

Means (not shown) are provided to shift yoke 32 in the direction of the axes of tubes 21 and 22 and thereby telescope sleeve 28 to a greater or lesser degree within these tubes. If desired, a plurality of sleeves 28 are moved in unison by a common yoke 32 to achieve tracked tuning of a plurality of tuned circuits.

Suitable indicator means (not shown) calibrated in terms of frequency or wavelength is preferably provided to indicate the position of sleeve 28 in terms of the resonant frequency of the tuned circuit.

The effect of alternating current flow through the elongated U-shaped coil defined by conductor 20 is to induce eddy current flow in the sleeve 28. The resultant eddy currents are in direction, magnitude, and phase to overcome the magnetizing effects of the current flow in the coil, thereby creating a field free space within sleeve 28. Since this field free space is unavailable for magnetic flux lines encircling the conductor 20, the inductance thereof is decreased to the extent the sleeve 28 is telescoped within the cylinder defined by that conductor.

The sleeve 28 also progressively encircles the core 26 as it is shifted within the coil defined by conductor 20. This reduces the effect of that core in contributing to the inductance of the coil and, in addition, substitutes its power losses for the power losses otherwise associated with the time varying magnetic field within core 26. This variation in losses may be chosen to make the resultant inductance act as if having internal resistance in proportion to its reactance and hence to appear to have a constant value of Q.

Figure 4:
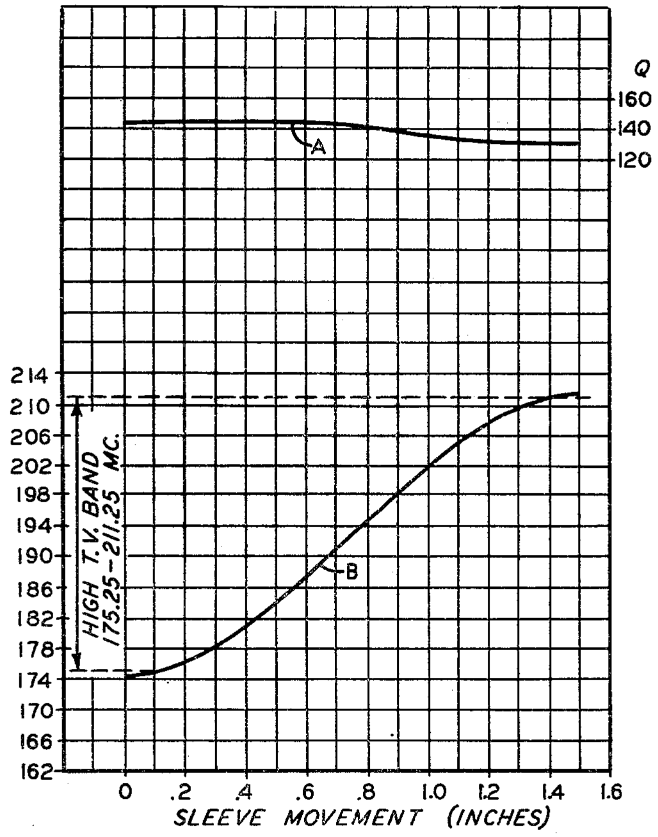
Figure 4 is a chart showing the performance of the structure of Figure 1.

Figure 4 shows the results of tests on an inductor of the type shown in Figure 1 and having the following dimensions:

Sleeve 28—copper, 0.25″ and 0.205″ outside and inside diameters, respectively;
Conductor 20—flexible copper strap with legs 20*a* and 20*b*, 0.21″ wide and 0.005″ thick and 1⅜″ high;
Core 26—0.200″ diameter.

It will be evident from curve A that the Q of the inductance remains constant within about 9 percent over the entire 175.25 to 211.25 mc. high frequency television band. Moreover, as shown in curve B, the tuning curve is very nearly a straight line within this frequency band.

The actual sleeve movement shown in Figure 4 is approximately 1.3 inches for the television band shown. This degree of movement is ample to permit adjustment of the inductor to any television station within this band without requiring a special precision mechanism having no backlash or lost motion. Thus, simple and inexpensive mechanism may be provided to shift yoke 32 without losing the desirable characteristics of accurate and reproduceable tuning.

Figures 5, 6, and 7 are like Figures 1, 2, and 3, respectively, but the core 26 is moved to achieve tuning and sleeve 28 is omitted. Since movement of the tuning plunger defined by core 26 causes the flux encircling the conductor 20 to vary, tuning action is achieved as that core is shifted to a greater or lesser telescoping relation with the tubes 21 and 22.

In the structure of Figures 8 to 10, the conductor 20 defines two turns of elongated U-shape configuration. As shown, this conductor defines a plurality of parallel leg portions 20*c*, 20*d*, 20*e* and 20*f* which form the elements of the cylinder defined by the annular space between tubes 21 and 22. A lower bridging member 20*g* connects the legs 20*d* and 20*e*. Upper bridging members 23*a* and 23*b*, in the shape of segments of the cylinder defined by tube 21, connect the legs 20*c* and 20*e* and 20*d* and 20*f*, respectively, thereby defining a two-turn winding when the conducting path is traced from one end of conductor 20 to the other. The magnetic axis of this winding is transverse the axes of tubes 21 and 22.

The sleeve 28 acts as a tuning plunger to vary the inductance of the two turn coil of Figures 8 to 10 in accord with the degree to which it telescopes that coil.

It will be observed that the bridging members 23*a* and 23*b* form segments of the cylinder defined by the legs 20*c* to 20*f* and thereby permit the sleeve 28 to move freely without contacting the conducting portions of the structure. However, the bridging connection 20*g* extends diametrically across this cylinder since it is beyond the limit of movement of sleeve 28.

Figures 11, 12, 13, and 14 show another form of the present invention like that of Figures 8, 9, and 10 but in which a unitary structure of the inductor and a trimmer capacitor is provided. As shown, a two turn elongated U-shaped coil is defined by the lengthy parallel conducting legs 22c, 22d, 22e, and 22f in conjunction with the ring 34 and the conducting segments 23a and 23b.

A conducting ring 34, Figure 11, snugly fits about the tube 22 adjacent the bottom end thereof. The bottom ends of elements 20d and 20e are soldered or otherwise attached to this ring to define a two-turn coil.

The magnetic core member 26 is supported within the tubes 21 and 22 as shown, thus defining an annular space within which the sleeve 28 telescopes.

The ends of conductor 20 extend in directions transverse to the axes of the tubes 21 and 22 and are attached to the opposed condenser plates 36 and 38. As seen best in Figure 13, the condenser plate 36 is resilient and tends to bend upwardly to the curved condition shown, thereby providing minimum capacitance across ends of conductor 20. This tendency is adjustably overcome by the screw 40 which rides in a threaded opening in the insulating base plate 24. This screw acts against the insulating washer 40a. Moreover, an insert 42 of mica or similar low-loss dielectric material is interposed between plates 36 and 38 to prevent electrical contact between the same.

It will be evident that the structure of Figures 11 to 13 provides an inductor tunable by shifting movements of the sleeve 28 and, in addition, which is provided with a unitary trimmer condenser for adjusting the resonant frequency at any one position of sleeve 28.

In the foregoing specification and the appended claims I have used the term cylinder to define the surface generated by straight line translational movements of a two-dimensional closed surface without regard to whether that surface is a circle.

While I have referred in this specification to telescoping movements of the tuning plunger relative to the tubes 21 and 22, it will be observed that these movements also telescope the cylinder defined by the conductor 20 and the bridging member 23 or bridging members 23a and 23b.

While I have shown specific embodiments of my invention, it will, of course, be understood that I do not wish to be limited thereto since many modifications and alternative constructions may be made without departing from the spirit and scope thereof. I intend by the appended claims to cover all such modifications and alternative constructions as fall within the true spirit and scope of my invention.

What I claim as new and desire to secure by Letters Patent of the United States is:

1. A variable inductor for use in very high-frequency circuits comprising an elongated cylindrical tube formed of insulating material, an elongated U-shaped inductance element comprising a pair of leg portions fitted snugly over said tube and defining diametrically opposed segments of a cylinder and having also a top portion surrounding said tube near one end thereof and comprising a complete circular annulus conductively joining said leg portions, a cylindrical conducting member received within said tube and adapted for telescoping movement therewith, means for slidably moving said conducting member within said tube and outward therefrom through and beyond said annulus, whereby the portion of said conducting member oriented between said leg portions may be varied within predetermined limits, and connecting means for the respective ends of said leg portions remote from said annulus adapted to permit the electrical connection thereto of an external circuit.

2. Apparatus according to claim 1 wherein said conducting member is hollow and having also a cylindrical core of magnetically permeable material carried within said tubing and means for anchoring said permeable core against movement relative to said leg portions.

DONALD R. DE TAR.

REFERENCES CITED

The following references are of record in the file of this patent:

UNITED STATES PATENTS

| Number | Name | Date |
|---|---|---|
| 542,471 | Golden | July 9, 1895 |
| 642,859 | White | Feb. 6, 1900 |
| 2,106,120 | Lindberg | Jan. 18, 1938 |
| 2,222,387 | Wheeler et al. | Nov. 19, 1940 |
| 2,431,425 | Sands | Nov. 25, 1947 |
| 2,497,662 | Dressel | Feb. 14, 1950 |

FOREIGN PATENTS

| Number | Country | Date |
|---|---|---|
| 230,818 | Switzerland | Jan. 31, 1944 |
| 254,568 | Great Britain | July 8, 1926 |
| 581,065 | France | Sept. 18, 1924 |